Nov. 29, 1938.   R. E. GREENFIELD   2,138,274
SEPARATION OF SOLIDS FROM LIQUIDS
Filed March 4, 1936    2 Sheets-Sheet 2
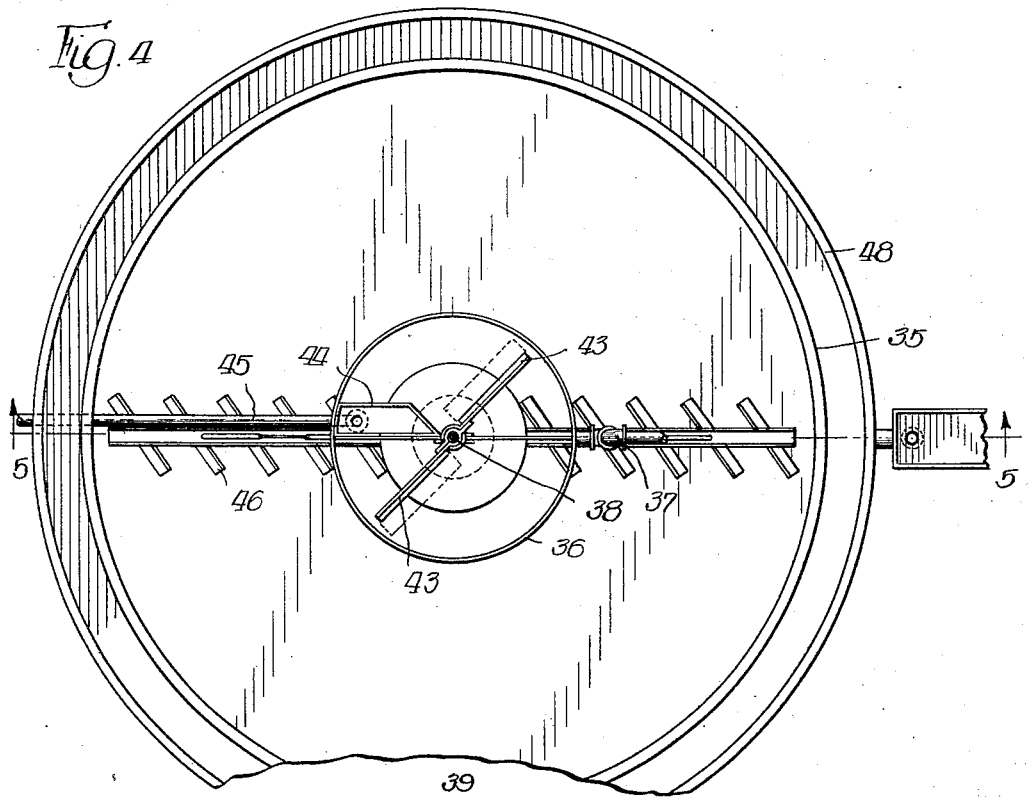
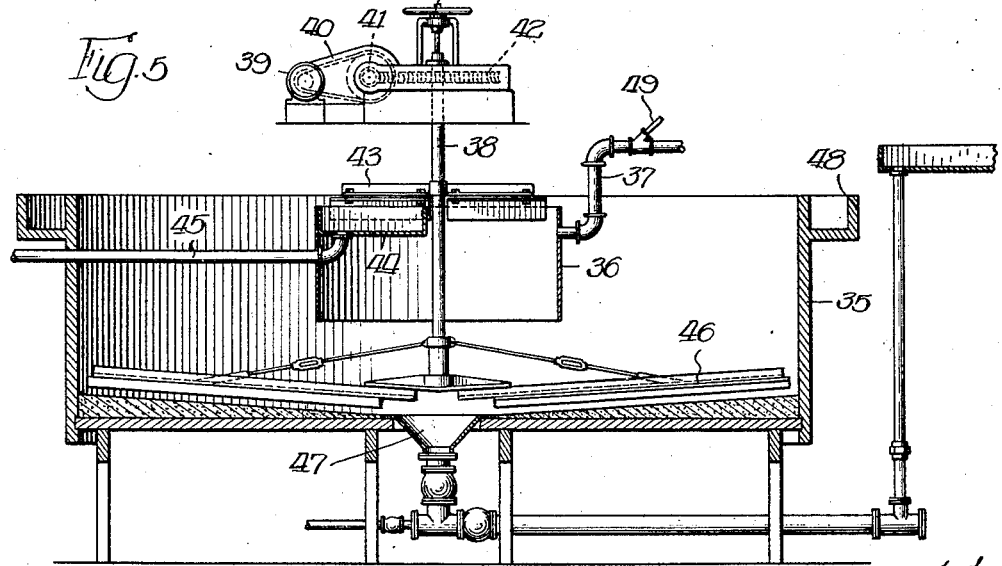
Inventor:
Robert E. Greenfield,
By Cromwell, Greist & Warden
Attys Patented Nov. 29, 1938

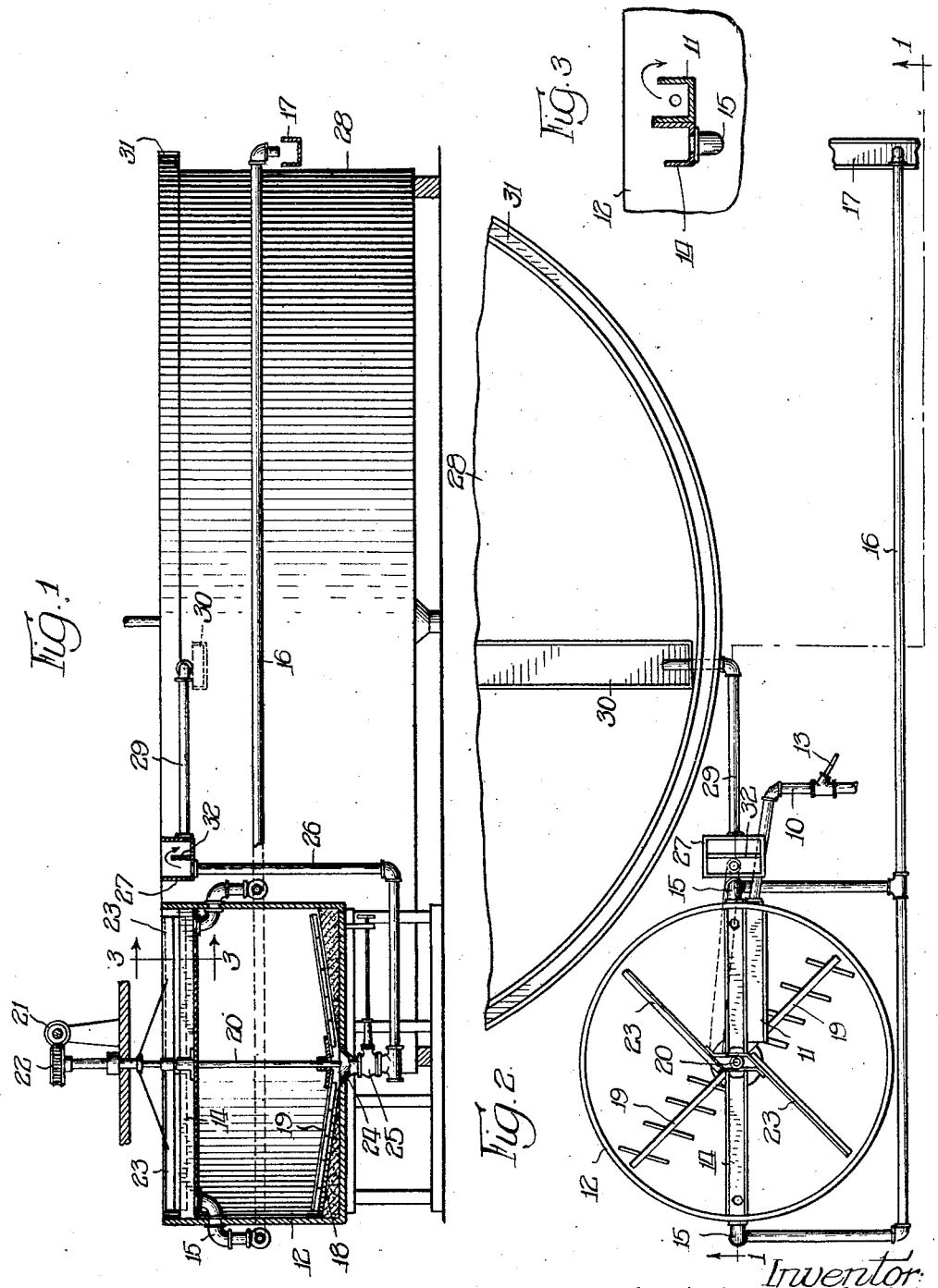

2,138,274

UNITED STATES PATENT OFFICE 2,138,274

SEPARATION OF SOLIDS FROM LIQUIDS

Robert Edman Greenfield, Decatur, Ill., assignor to A. E. Staley Manufacturing Company, Decatur, Ill., a corporation of Delaware Application March 4, 1936, Serial No. 67,102

3 Claims. (Cl. 127—65)

The present invention relates to the separation of solids from liquids and has particular reference to the method of and apparatus for settling slurries in which the solids content consists of a mixture of several constituents normally settling together but which require a relatively long period of time for settling because of the synergetic effect of the component parts of the mixture. An example of a slurry of this type is to be had in the so-called "table tails" normally produced in the production of starch products by the wet starch method. For the purpose of explanation the invention will be described with particular reference to this material.

A principal object of the invention is to provide a method of and apparatus for the improved settling of a slurry consisting of table tails.

An additional object is to provide for the more ready separation from liquids of a mixture of solids containing materials which inhibit the settling of the mixture.

A further object is to treat a gluten slurry in such a manner as to remove certain constituents thereof which retard the settling of the remaining constituents.

These and other objects will be apparent from a consideration of the following specification and by reference to the accompanying drawings, in which Fig. 1 is a view of apparatus constructed in accordance with the invention, including a main settling tank and a preliminary separation chamber, the latter being in section taken along line I—I of Fig. 2;

Fig. 2 is a top view of the device shown in Fig. 1;

Fig. 3 is a fragmentary sectional view taken along line 3—3 of Fig. 1 and disclosing the feed and discharge troughs thereof;

Fig. 4 is a top view of a modified form of the apparatus for carrying out my invention; and Fig. 5 is a sectional view of the device shown in Fig. 4 taken along line 5—5 thereof.

In the manufacture of starch and its products from corn, it is customary to grind the corn and to separate the germ and fibrous constituents thereof, the latter steps resulting in the production of a starch-gluten suspension in water. The starch customarily is passed over an inclined table for separation of the heavier starch from the gluten. The gluten suspension passing over the end of these tables is commonly known in the industry as "table tails".

Customarily, this gluten suspension is passed to a settler for separation of the gluten therefrom. The gluten consists of finely divided particles which do not settle readily and considerable time is required for an efficient separation of the solids from the liquid. This time is objectionable from the standpoint of increasing the amount of settling steps required and also affords a greater opportunity for bacterial development in the settler.

In the apparatus shown in Figs. 1 to 3 the gluten tails to be settled are passed through a supply line 10 which may be connected to the reservoir at the end of the tables, and the supply line communicates with the overflow trough 11 which is positioned in an initial separation tank 12. Prior to entrance of the gluten tailings into the preliminary separation chamber 12 the tailings are intimately mixed with air which is introduced into the supply line 10 by means of line 13. As the gluten tailings have an agitating motion in passing through the line 10 it is not essential to employ additional agitation for producing a thorough intermixture of the air with the liquid suspension. The air impregnated gluten suspension overflows from trough 11 into the main body of the preliminary separation chamber and in time fills the chamber to a level adjacent the overflow trough 14. This overflow trough passes through the center of the tank and has outlet connections 15 on each side of the tank. These outlet connections communicate with a common line 16 and the latter empties into a trough 17 leading to a source of disposal of gluten.

The conical-shaped bottom 18 of tank 12 is provided with a rotating mechanism 19 for collecting any solids which settle in the bottom of the tank and discharging such solids by plowing them into the outlet sump 24, this mechanism being driven by a central vertical shaft 20 extending upwardly through the drainage trough 14. Driving means such as the driven worm 21 and gear 22 are provided for imparting the relatively slow movement to the blades of agitator 19. Adjacent the top of tank 12 the shaft 20 carries two flexible scraper members 23 which rotate with the shaft in a clockwise direction. The bottom edges of the flexible scrapers 23 extend slightly below normal liquid level of the tank 12 and act to skim solids from the top liquid into the drainage channel 14.

In other words, as the skimming devices 23 rotate in the tank any floating solids contained on the top of the body of liquid in the tank 12 are wiped into trough 14.

An outlet sump 24 is provided in the bottom of tank 12 and liquid is passed from the tank outwardly therefrom through valve 25 and conduit 26. The conduit 26 leads to a feed box 27 positioned adjacent the top of settling tank 28. Liquid passing into the open feed box 27 is drained through pipe 29 into the trough 30 leading to a feed well (not shown) in the tank 28. An overflow channel 31 is provided adjacent the top of the settling tank.

By proper regulation of the valve 25 the liquid level in tank 12 may be maintained substantially constant. The feed from tank 12 into tank 28 may be effected by proper adjustment of the height of weir 32 in the feed box 27, or, a head may be imparted to the pipe 26 by means of a suitable pump.

The slurry obtained from the starch tables generally contains about two or three ounces of solids per gallon. The settlers represented by tank 28 in the drawings may be of the fill and draw type or may be a continuous settler where thickened solids are continuously discharged from the bottom of the tank and clear overflow discharged from the top, as through overflow trough 31. As the gluten and air overflow into the preliminary treatment tank 12 and fill the latter to its normal liquid level certain constituents of the gluten mixture are mechanically combined with the small bubbles of air with considerable tenacity and as the liquid is introduced at the top of tank 12 the combined air solid particles remain adjacent the top of the preliminary treatment tank in the form of a froth or scum. The paddles 23 act to wipe this scum and a certain amount of water into discharge trough 14, thereby effecting a separation of the floated constituents of the gluten mixture from the constituents thereof which are not combined with the air. Apparently, the air more readily combines with a certain class of constituents of the gluten mixture than with the other constituents thereof. There is, then, a selective separation of the solids in the gluten mixture. The gluten solids passing out of trough 14, connections 15 and line 16, generally are of such concentration as to avoid the necessity of settling to remove liquid, and the solids ordinarily can be directly filter pressed or otherwise treated.

The rotating members 19 operate in such a manner as to scrape any sediment which may settle onto the bottom of the tank into the stream of outgoing liquid in sump 24, so that the pre-treatment tank operates solely to remove the constituents of the gluten tailings which more readily adhere to the air. The removed constituents when in combination with the air are sufficiently light as to remain at the top of the tank. The liquid level is adjacent the trough 14 and the skimming device operates to remove the floated particles. The remaining constituents of the gluten mixture pass downwardly through the tank and into the settling tank 28. The pre-treated gluten tailings have a considerably more rapid rate of settling than similar tailings which have not been treated in the manner described. In other words, after removal of the constituents which more readily adhere to impregnated air, it is possible to obtain a greater concentration of solids in the lower part of the settling chamber in a shorter length of time than has been possible heretofore.

This fact indicates that the removed constituents inhibit in some manner the settling characteristics of the remaining constituents of the gluten tailings. After the settling operation the concentrated gluten-water mixture in the bottom of tank 28 may be drawn off through the outlet conduit 32 and filter pressed or otherwise treated in the usual manner.

In the embodiment of the invention shown in Figs. 4 and 5 a settling tank 35 is provided with a central feed well 36 which acts to perform the pre-treatment as described with respect to tank 12. That is, the pre-treating tank is combined with the settling tank. The gluten tailings are fed into the feed well 36 through line 37 at a point adjacent the liquid level therein.

Tank 35 is provided with central shaft 38 rotated by motor 39, chain 40, worm 41 and worm gear 42 mounted rigidly on shaft 38. A suitable hand-operated device 39 is provided for raising or lowering the shaft if necessary. Adjacent the liquid level in the pre-treatment feed well 36 the shaft 38 is provided with flexible skimming devices 43 which are operable to transfer froth and the like from the top of the liquid in the pre-treatment compartment into the discharge trough 44, the latter being provided with a discharge line 45.

The bottom of the shaft 38 is provided with collecting mechanism 46 which tends to move solids deposited on the conical bottom of tank 35 into the sump 47. From the sump 47 the deposited solids are transferred to a suitable source of disposal such as to a filter press.

The top of tank 35 is provided with an overflow trough 48 which transfers clear water from the top of the tank to a place of disposal.

In operation of the device shown in Figs. 4 and 5 the gluten tailings are transferred through line 37 and air is injected into the tailings by means of a compressed air supply 49. The agitating motion of the gluten suspension in the pipe 37 is sufficient to break the air up into relatively fine particles which adhere to the undesirable constituents of the gluten. When the tailings enter the pre-treatment compartment and feed well 36 adjacent the liquid level thereof the lighter particles to which the air adheres remains at the top of the tank, while the remaining constituents of the gluten pass downwardly through the feed well and enter the tank 35 at a lower point therein. After removal of the lighter constituents at the top of the tank by the skimming devices 43 the remaining constituents of the gluten will settle at a considerably more rapid rate than if the undesirable constituents had not been removed.

In both embodiments of the invention the gluten mixture is combined with air in such a manner that certain constituents of the mixture are allowed to mechanically combine with the air. The mixture then is introduced adjacent the top of a pre-treatment compartment and due to the lightness of the particles mechanically combined with the air the particles do not pass downwardly through the liquid as do the other constituents of the gluten. From the top of the pre-treatment tank the undesirable constituents are removed by a skimming device and the remaining constituents thereafter will be more readily settled than if the preliminary separation had not been effected. The reason for this more ready separation of the remaining constituents of the gluten mixture is not clear. Apparently the removed constituents have a synergetic effect upon the other constituents which results in slow settling in the formation of a less concentrated solid mass in the bottom of the settling tank.

In some instances equipment will be employed in the handling of the gluten tailings which will produce a mechanical incorporation of air in the tailings. For example, centrifugal pumps may be employed for transferring the tailings from the tables to the pre-treatment compartment, and these pumps may incorporate air in the tailings. Additional air then may be supplied if desirable in the manner described herein.

Various changes in the structure and procedure described herein will occur upon a consideration of the invention and such changes coming within the scope of the invention are intended to be included in the appended claims.

I claim:

1. Process for separating gluten from water in table tails produced in the wet milling method for separating starch from corn, which comprises subjecting the table tails to air under pressure and intimately mixing the same therewith, introducing the mixture into a flotation chamber at a point adjacent the top thereof, skimming off constituents of said gluten rising with said air from adjacent the top of the flotation compartment, removing the remaining constituents of the table tails from a lower part of the flotation compartment, and subjecting said remaining constituents to a settling operation.

2. The process for treating a gluten suspension produced in the wet milling operation for separation of starch from corn, which comprises intimately mixing air with said suspension, subjecting the resulting mixture to a flotation operation to remove said air and constituents of said suspension rising with said air, and subjecting the remainder of said suspension to a settling operation.

3. The process for treating a gluten suspension produced in the wet milling operation for separation of starch from corn, which comprises injecting a jet of compressed air into said suspension and intimately mixing the same therewith, separating said air and constituents of said gluten rising therewith from said suspension, and settling the remainder of said suspension.

ROBERT EDMAN GREENFIELD.